US012537601B2

(12) United States Patent
Tanaka

(10) Patent No.: US 12,537,601 B2
(45) Date of Patent: Jan. 27, 2026

(54) COMMUNICATION DEVICE AND COMMUNICATION DEVICE CONFIGURATION METHOD

(71) Applicant: NEC Corporation, Tokyo (JP)

(72) Inventor: Hiroaki Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 240 days.

(21) Appl. No.: 18/276,175

(22) PCT Filed: Mar. 26, 2021

(86) PCT No.: PCT/JP2021/012947
§ 371 (c)(1),
(2) Date: Aug. 7, 2023

(87) PCT Pub. No.: WO2022/201516
PCT Pub. Date: Sep. 29, 2022

(65) Prior Publication Data
US 2024/0121003 A1   Apr. 11, 2024

(51) Int. Cl.
*H04B 10/27*  (2013.01)
*H04B 10/40*  (2013.01)
(Continued)

(52) U.S. Cl.
CPC ............. *H04B 10/27* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

2003/0031433 A1*  2/2003  Feinberg ............. H04J 14/0227
385/100
2003/0215231 A1*  11/2003  Weston-Dawkes .........................
H04J 14/0295
398/19
(Continued)

FOREIGN PATENT DOCUMENTS

JP    H05-292038 A    11/1993
JP    2001-144693 A    5/2001
(Continued)

OTHER PUBLICATIONS

JP Office Action for JP Application No. 2023-508390, mailed on Mar. 11, 2025 with English Translation.
(Continued)

*Primary Examiner* — Darren E Wolf
(74) *Attorney, Agent, or Firm* — Sughrue Mion, PLLC

(57) ABSTRACT

In order to provide a technology for realizing a communication device capable of providing various functions without increasing the types of hardware, this communication device used for a submarine cable system includes a plurality of functions blocks; the function bocks each include interfaces to which an optical signal can be connected; one of the function blocks can be optically connected with a land communication network through the interfaces; the other function blocks can be optically connected with a submarine cable through the interfaces; the function blocks optically connected through the interfaces carry out, on optical signals, processes based on the functions of the function blocks.

10 Claims, 17 Drawing Sheets

(51) Int. Cl.
*H04B 10/50* (2013.01)
*H04B 10/60* (2013.01)

(56) References Cited

U.S. PATENT DOCUMENTS

| | | |
|---|---|---|
| 2005/0089027 A1 | 4/2005 | Colton |
| 2006/0045532 A1 | 3/2006 | Yano |
| 2008/0239443 A1* | 10/2008 | Korevaar ............... G02B 6/359 |
| | | 359/223.1 |
| 2009/0060504 A1* | 3/2009 | Chang ................. H04J 14/0284 |
| | | 398/48 |
| 2011/0311216 A1* | 12/2011 | Inoue .................... H04B 10/27 |
| | | 398/1 |
| 2012/0201542 A1 | 8/2012 | Dahlfort |
| 2014/0219080 A1* | 8/2014 | Kim ....................... H04L 45/28 |
| | | 370/221 |
| 2016/0191188 A1 | 6/2016 | Butler |

FOREIGN PATENT DOCUMENTS

| | | |
|---|---|---|
| JP | 2004-505542 A | 2/2004 |
| JP | 2006-042012 A | 2/2006 |
| JP | 2007-515815 A | 6/2007 |

OTHER PUBLICATIONS

International Search Report for PCT Application No. PCT/JP2021/012947, mailed on Jun. 22, 2021.
English translation of Written opinion for PCT Application No. PCT/JP2021/012947, mailed on Jun. 22, 2021.

* cited by examiner

COMMUNICATION DEVICE AND COMMUNICATION DEVICE CONFIGURATION METHOD

This application is a National Stage Entry of PCT/JP2021/012947 filed on Mar. 26, 2021, the contents of all of which are incorporated herein by reference, in their entirety.

TECHNICAL FIELD

The present invention relates to a communication device and a communication device configuration method, more particularly to a communication device and a communication device configuration method that are used in a terrestrial station for connecting a submarine cable and a terrestrial network to each other in an ocean communication system using the submarine cable.

BACKGROUND ART

As functions of an ocean communication system are becoming more complicated, types of functions required for a terrestrial station are also increased. In particular, as a specification of the ocean communication system is widely disclosed, boundaries by which the functions of the system are defined are becoming diverse. As a result, in order to deal with this situation, there has been a demand for a communication device in the terrestrial station to include a large number of types of interfaces.

In relation to the present invention, PTL 1 describes a submarine optical terminal station transmission device and a submarine optical terminal station reception device that are used in an ocean communication system. Further, PTL 2 describes a terminal station device including a 3R repeater.

CITATION LIST

Patent Literature

PTL 1: Japanese Unexamined Patent Application Publication No. H5-292038
PTL 2: Japanese Unexamined Patent Application Publication No. 2001-144693

SUMMARY OF INVENTION

Technical Problem

Preparing a communication device dedicated to a function required for a terrestrial station causes an increase in types of hardware for the communication device. Further, an increase in types of hardware for the communication device causes workload for management and cost to increase for both a manufacturer of the communication device and a user of an ocean communication system constituted of the communication device.

OBJECT OF INVENTION

An object of the present invention is to provide a technique for achieving a communication device capable of providing various functions without increasing types of hardware.

Solution to Problem

A communication device according to the present invention is a communication device that is used in a submarine cable system and includes a plurality of function blocks, wherein the function blocks each include an interface connectable with an optical signal, one of the function blocks is optically connectable to a terrestrial communication network via the interface, another of the function blocks is optically connectable to a submarine cable via the interface, and the function block optically connected via the interface subjects the optical signal to processing based on a function of the function block.

A communication device configuration method according to the present invention is a configuration method for a communication device that is used in a submarine cable system and includes a plurality of function blocks each including an interface connectable with an optical signal, the method including processing of: configuring one of the function blocks to be optically connectable to a terrestrial communication network via the interface; configuring another of the function blocks to be optically connectable to a submarine cable via the interface; and subjecting the optical signal to processing based on a function of the function block, by the function block optically connected via the interface.

Advantageous Effects of Invention

The present invention can provide a communication device capable of providing various functions without increasing types of hardware.

EXAMPLE EMBODIMENT

Figure 1:
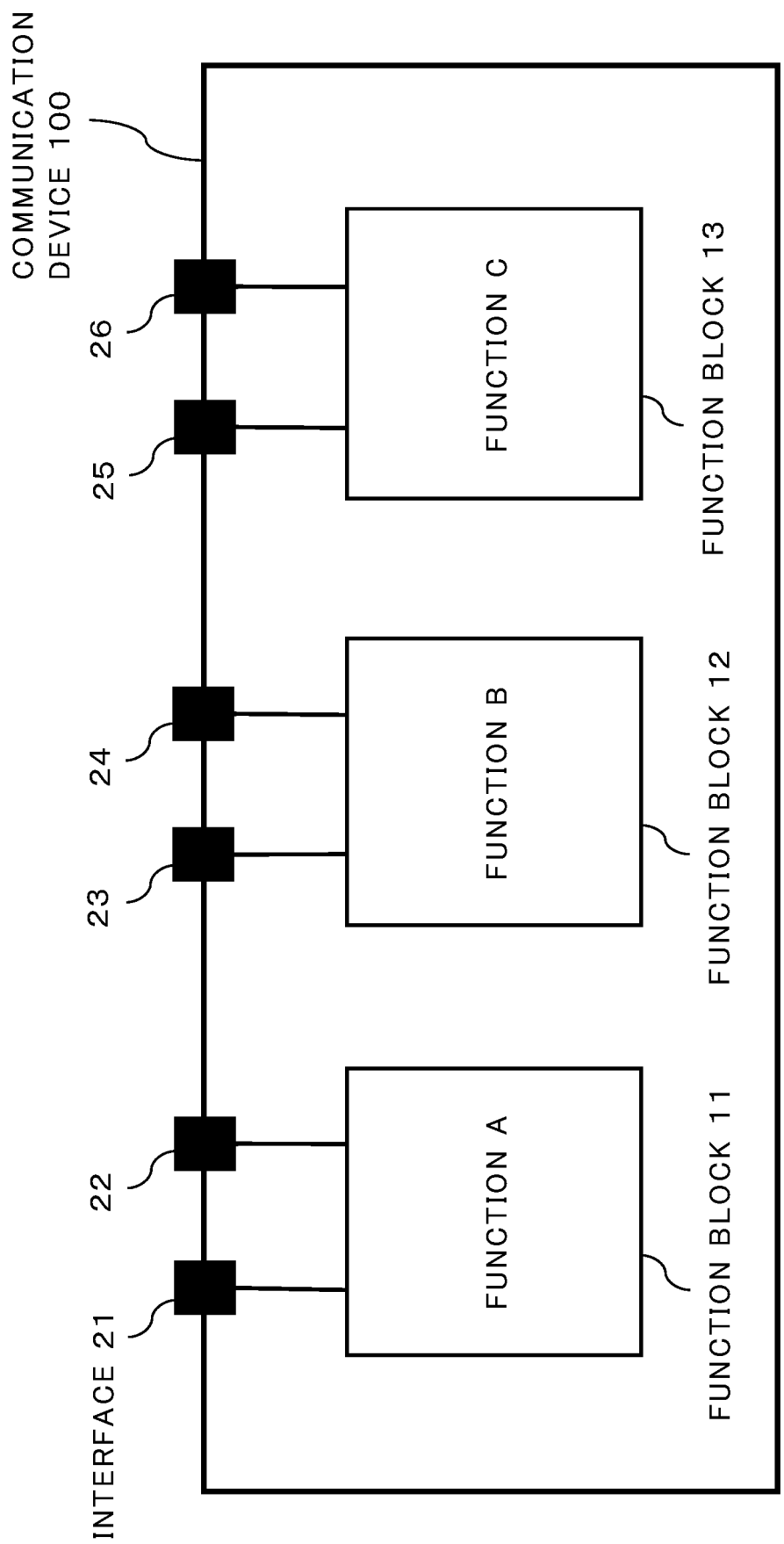
FIG. 1 is a block diagram illustrating a configuration example of a communication device 100 of a first example embodiment.

Example embodiments of the present invention are described below with reference to the drawings. The arrows illustrated in the drawings depict directions of a signal, and are not intended to limit the directions. Further, an intersection of lines indicating paths of signals in the drawings does not indicate coupling or splitting of the signals, unless otherwise noted. Specifically, the intersections of the lines indicating the paths of the signals in the drawings do not affect the signals intersecting with each other. In each of the example embodiments and the drawings, aforementioned elements are denoted with the same reference symbols, and overlapping description thereof is omitted.

First Example Embodiment

FIG. 1 is a block diagram illustrating a configuration example of a communication device 100 of a first example embodiment of the present invention. The communication device 100 is a communication device used in an ocean communication system. The communication device 100 includes function blocks 11 to 13 and interfaces 21 to 26. The function blocks 11 to 13 can be connected to connection destinations of the interfaces with an optical signal via the interfaces 21 to 26. The interfaces 21 and 22 are interfaces of the function block 11. The interfaces 23 and 24 are interfaces of the function block 12. The interfaces 25 and 26 are interfaces of the function block 13. One of the function blocks 11 to 13 is connected to a terrestrial communication network. Another of the function blocks 11 to 13 is connected to a submarine cable.

The function blocks 11, 12, and 13 include functions A, B, and C. The functions A to C indicate predetermined processing relating to an optical signal that is input or output in the function blocks 11 to 13. All the functions A to C may be different from one another, or the functions A to C may include the same function.

Figure 2:
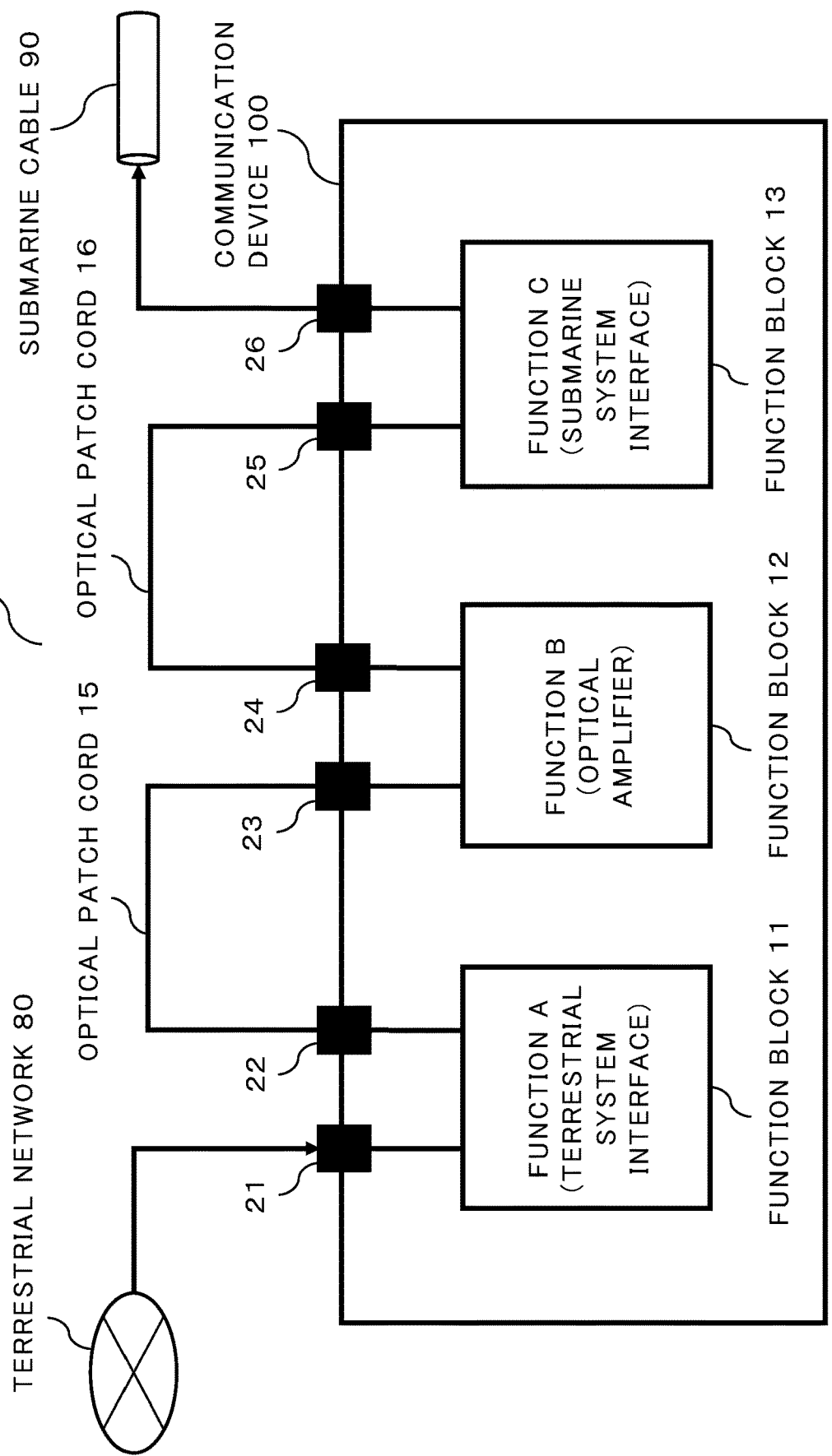
FIG. 2 is a diagram illustrating a first example of a connection configuration between function blocks of the communication device 100.

FIG. 2 illustrates a first example of a connection configuration between the function blocks of the communication device 100. The communication device 100 is used in a communication system 1 including a terrestrial network 80 and a submarine cable 90. The function block 11 of the communication device 100 includes an interface with respect to the terrestrial communication network (terrestrial network) 80. The function block 12 includes an optical amplifier. The function block 13 includes an interface with respect to the submarine cable 90. For example, the function block 11 provides a terrestrial system interface function (the function A) for performing conversion between the optical signal in the terrestrial network 80 and the optical signal inside the communication device 100. The function block 12 provides an optical amplification function (the function B) for amplifying the optical signal being input. The function block 13 provides a submarine system interface function (the function C) for performing conversion between the optical signal propagating through the submarine cable and the optical signal propagating through the inside of the communication device 100.

In FIG. 2, the interface 21 of the function block 11 is connected to the terrestrial network 80, and the function block 12 of the interface 22 is connected to the interface 23. The interface 24 of the function block 12 is connected to the interface 25 of the function block 13. The interface 26 of the function block 13 is connected to the submarine cable 90. For example, with such connection, the optical signal received by the function block 11 from the terrestrial network 80, is subjected to processing by the functions A, B, and C in the function blocks 11, 12, and 13, respectively, and is finally transmitted to the submarine cable 90. Specifically, the optical signal propagating through the terrestrial network 80 is received in the function block 11, and then is amplified in the function block 12. The amplified optical signal is transmitted by the function block 13 to the submarine cable 90. In this manner, the function blocks 11 to 13 that are optically connected via the interfaces subject the optical signal to the processing based on the functions of the function blocks 11 to 13. In other words, in the communication device 100, the function blocks 11 to 13 are capable of subjecting the optical signal to the processing in collaboration with the other function blocks.

A mode of optical connection (optical connection mode) between the interfaces 21 to 26 is not limited. For example, optical patch cords and 16 may be used for optical connection. Each of the optical patch cords 15 and 16 is an optical cable including optical connectors at both ends. Optical connectors to be fitted to the optical connectors of the optical patch cords 15 and 16 are used in the interfaces 21 to 26, the optical patch cords 15 and 16 and the interfaces 21 to 26 are connected to each other in a predetermined optical connection mode, and thus a predetermined function of the communication device 100 can be provided.

The optical connection mode between the optical patch cords 15 and 16 and the communication device 100 is determined according to the functions used in the communication device 100. The optical patch cord may be connected to the communication device 100 at the time of shipping from a factory. Alternatively, a worker may connect the optical patch cords 15 and 16 in such a way that the optical connection mode is a predetermined mode in a station building in which the communication device 100 is used. In the communication device 100 in FIG. 2, the functions of the communication device 100 can be changed by changing the optical connection mode of the optical patch cords 15 and 16, without replacing the hardware of the communication device 100.

Figure 3:
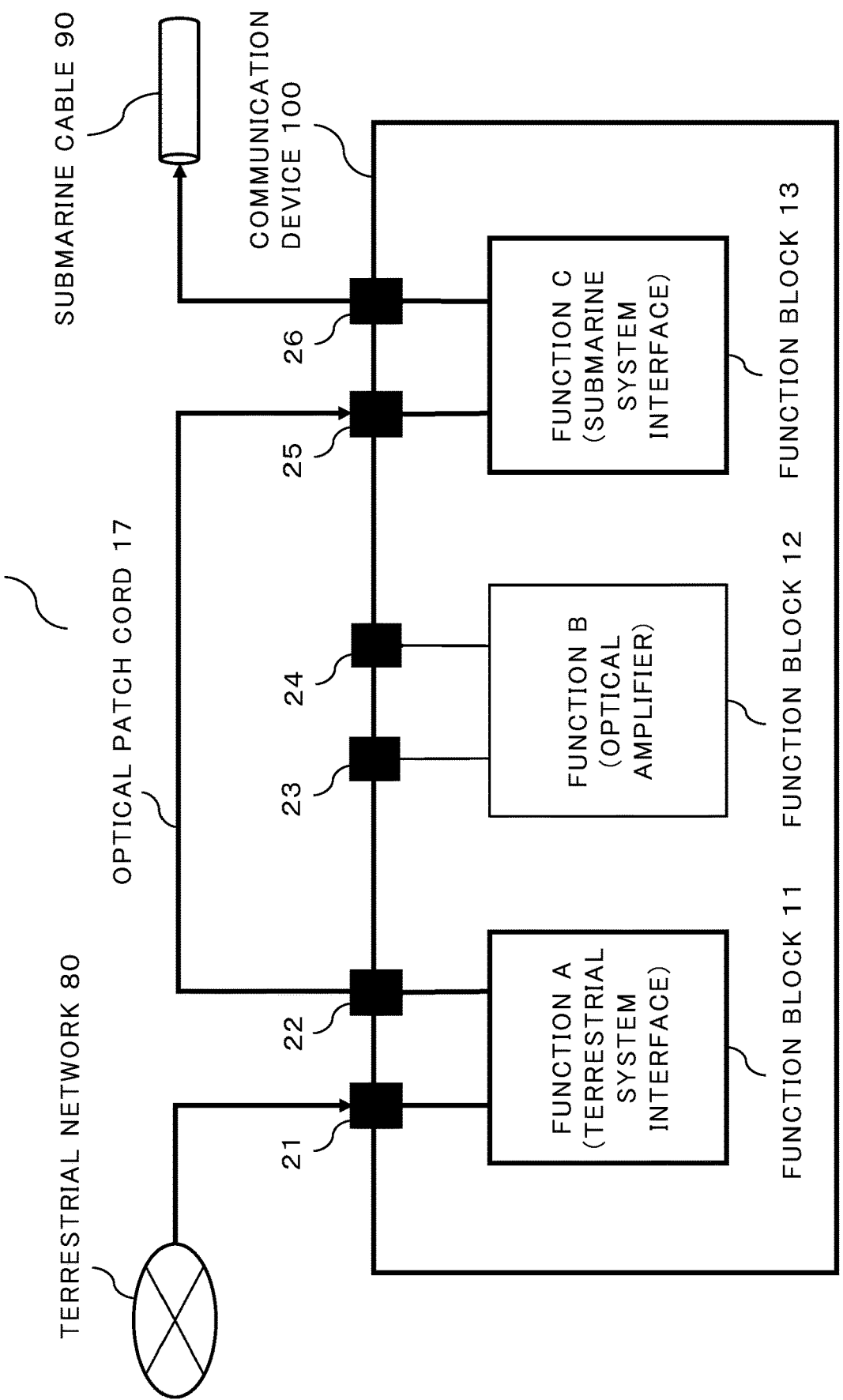
FIG. 3 is a diagram illustrating a second example of a connection configuration between function blocks of the communication device 100.

FIG. 3 is a diagram illustrating a second example of a connection configuration between the function blocks of the communication device 100 in the communication system 1. The second example illustrated in FIG. 3 is different from the first example illustrated in FIG. 2 in that the interface 22 of the function block 11 and the interface 25 of the function block 13 are directly connected via an optical patch cord 17. In the optical connection mode in FIG. 3, the optical signal output from the function block 11 does not pass through the function block 12. For example, when the optical signal that is output from the function block 13 to the submarine cable does not require large power, the communication device 100 may be operated in the optical connection mode in FIG. 3.

In this manner, the communication device 100 provides the predetermined function by defining the optical connection mode of the interfaces 21 to 26. As a result, the communication device 100 is capable of providing various functions according to the specification of the system without replacing the hardware (specifically, without increasing the types of hardware).

The optical patch cords 15 to 17 are removably mounted to the interfaces 21 to 26. Thus, the functions of the communication device 100 can easily be changed after the operation of the communication device 100 is started. For example, when it is required to increase the power of the optical signal to be transmitted to the submarine cable while the communication device 100 is operated in the optical connection mode in FIG. 3, the optical connection mode of the optical patch cord 15 may be changed from that in FIG. 3 to that in FIG. 2. With this change, the optical amplification function of the function block 12 is added to the communication device 100, and thus the optical signal input to the communication device 100 can be amplified.

Figure 4:
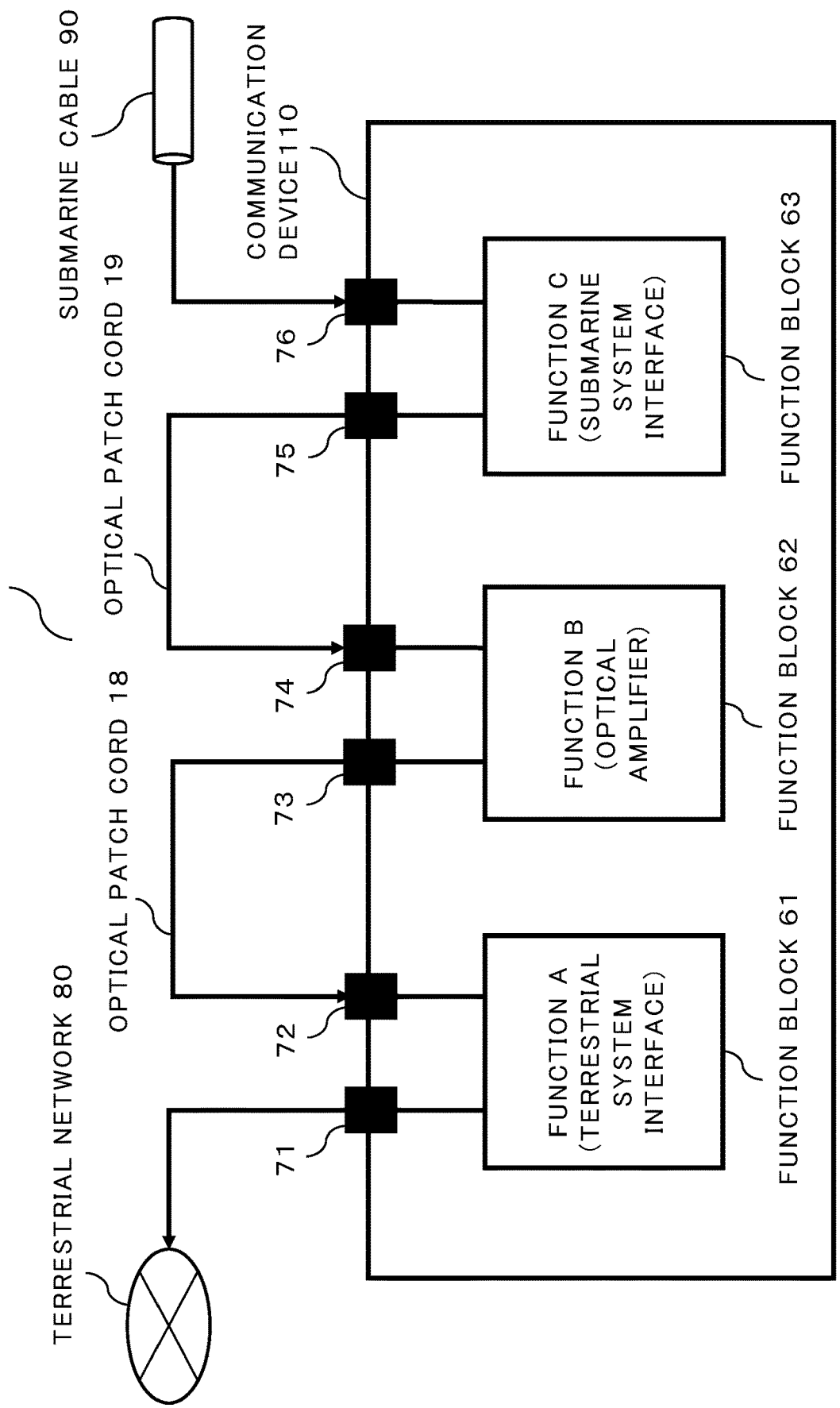
FIG. 4 is a diagram illustrating an example of a connection configuration between function blocks of a communication device 110.

FIG. 4 is a diagram illustrating an example of a connection configuration of function blocks of a communication device 110 in the communication system 1. FIG. 4 describes a case in which the optical signal is transmitted to a direction opposite to that in FIG. 2. The communication device 110 of FIG. 4 includes a function block 61 including the function A, a function block 62 including the function B, and a function block 63 including the function C. The function blocks 61, 62, and 63 include interfaces 71 and 72, 73 and 74, and 75 and 76, respectively. The interface 71 is connected to the terrestrial network 80, and the interface 76 is connected to the submarine cable 90. Further, the interface 72 and the interface 73 are connected to each other via an optical patch cord 18, and the interface 74 and the interface 75 are connected to each other via an optical patch cord 19. The optical signal propagating through the submarine cable 90 is received by the function C of the function block 63. The converted optical signal is input to the function block 62 of the function B via the optical patch cord 19, and is amplified. The amplified optical signal is input to the function block 61 of the function A via the optical patch cord 18. The function block 61 transmits the amplified optical signal to the terrestrial network 80.

In this manner, the optical signal that is transmitted to the direction opposite to that of the communication device 100 in FIG. 2 can also be subjected to a desired processing such as amplification of the optical signal by providing the function blocks 61 to 63 and connecting them via the optical patch cords 18 and 19. For example, the function blocks 61 to 63 and the interfaces 71 to 76 that are included in the communication device 110 illustrated in FIG. 4 may further be added to the communication device 100 illustrated in FIG. 2. By adding the function blocks 61 to 63, the communication device 100 is capable of executing the processing for the optical signal propagating in both directions between the terrestrial network and the submarine cable. With the function blocks 11 to 13 and 61 to 63, the communication device 100 is also capable of changing the functions in the system performing bidirectional transmission, without replacing the hardware by changing the optical connection mode of the optical patch cords. Specifically, with the configuration enabling bidirectional transmission, the communication device 100 can be provided as a communication device capable of providing various functions without increasing the types of hardware. The configurations of the communication devices 100 and 110 described in the present example embodiment are merely examples, and the number of function blocks, the functions thereof, and the connection configuration are not limited to the descriptions of the example embodiments.

(Minimum Configuration of Communication Device 100)

The communication device 100 may also be described as below. The reference symbols of the associated elements in FIG. 1 to FIG. 3 are denoted in the parentheses. Specifically, the communication device 100 is a communication device used in the submarine cable system (1), and includes a plurality of function blocks (11, 13). The function blocks (11, 13) each include the interfaces (21 and 22, 25 and 26) that can be connected with the optical signal. Further, one function block (11) can optically be connected to the terrestrial communication network (80) via the interface (21), and another of function block (13) can optically be connected to the submarine cable (90) via the interface (26). Further, the function blocks (11, 13) that are optically connected via the interfaces (21 and 22, 25 and 26) subject the optical signal to processing based on the functions of the function blocks (11, 13).

In the communication device 100 thus configured, the function blocks each include the interfaces to which connection from the outside of the communication device 100 is performed with the optical signal, and the function blocks connected with the optical signal subject the optical signal to the processing based on the functions of the function blocks. Thus, the communication device 100 is capable of providing various functions without increasing the types of hardware.

Second Example Embodiment

Figure 5:
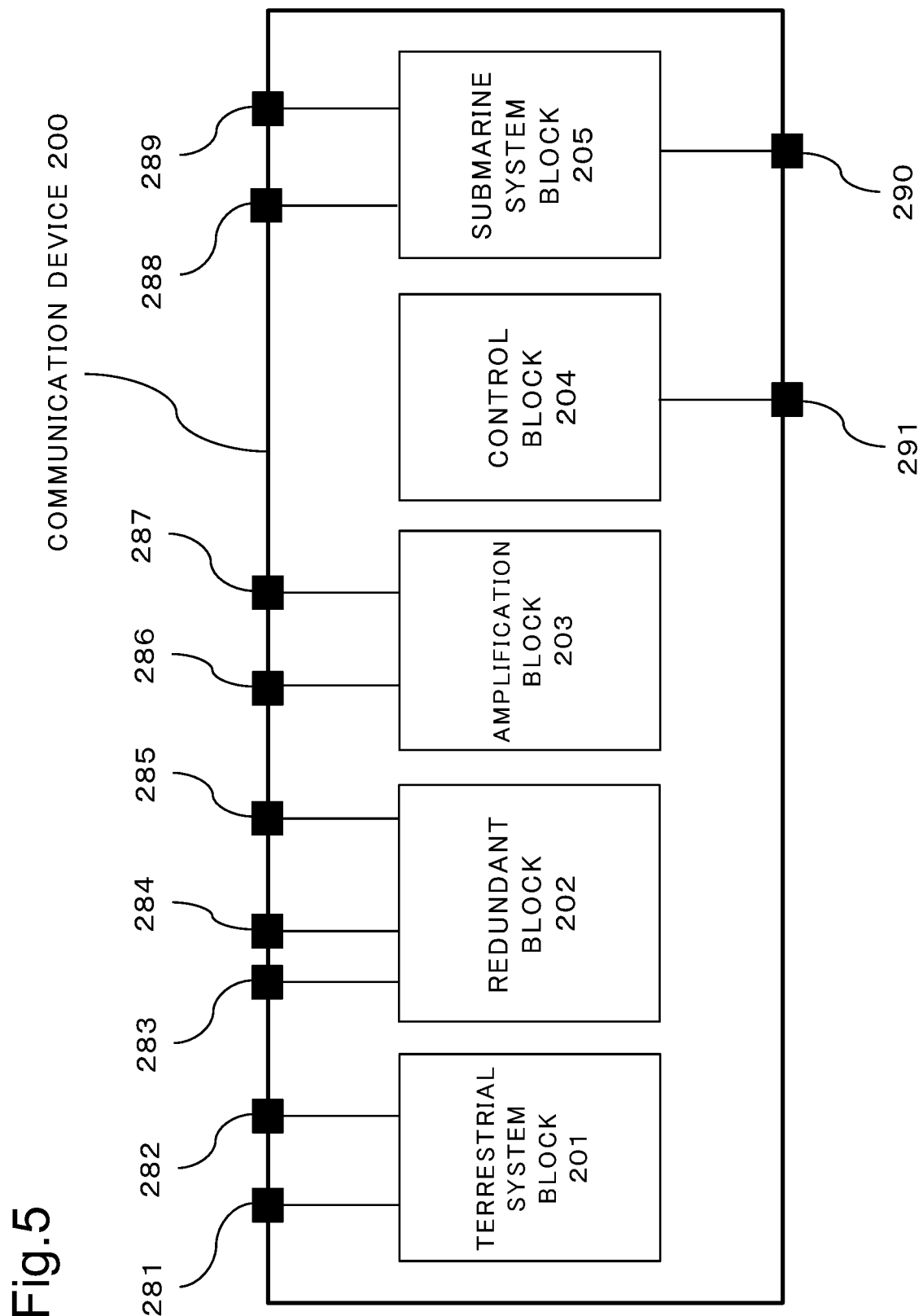
FIG. 5 is a block diagram illustrating a configuration example of a communication device 200 of the second example embodiment.

FIG. 5 is a block diagram illustrating a configuration example of a communication device 200 of a second example embodiment of the present invention. Similarly to the communication device 100 according to the first example embodiment, the communication device 200 is a communication device used in an ocean communication system. The communication device 200 includes five function blocks and interfaces 281 to 291. The five function blocks include a terrestrial system block 201, a redundant block 202, an amplification block 203, a control block 204, and a submarine system block 205.

The terrestrial system block 201 includes the two interfaces 281 and 282, and transmits or receives the optical signal between the communication device 200 and the terrestrial network 80. When another communication device connected to the communication device 200 includes a redundant configuration, the redundant block 202 splits or couples the optical signal transmitted between another communication device. For example, the redundant block 202 splits the optical signal input from the interface 285 into two, and outputs the optical signals from the interfaces 283 and 284. Alternatively, the redundant block 202 couples the two optical signals received from the interfaces 283 and 284, and outputs the optical signal from the interface 285. In this case, the redundant block 202 includes the three interfaces 283 to 285. The splitting number may be three or more.

The amplification block 203 includes the two interfaces 286 and 287, amplifies the optical signal input from the interface 286, and outputs the optical signal to the interface 287. The control block 204 transmits, to the submarine system block 205, the optical signal for monitoring and controlling a machine connected to the submarine cable 90. The control block 204 includes at least one of the functions including transmission and reception of the optical signal for monitoring and controlling. Examples of the machine connected to the submarine cable 90 include a submarine repeater, a branching unit (BU), and a reconfigurable optical add & drop multiplexer (ROADM).

The submarine system block 205 includes the three interfaces 288, 289, and 290. The submarine system block 205 transmits or receives the optical signal between the other function blocks and the submarine cable 90. The submarine system block 205 further includes the interface 290 to be used for connection with the interface 291 of the control block 204. The interface 290 and the interface 291 are connected as required.

The communication device 200 may include two groups each including the function blocks 201 to 205 and the interfaces 281 to 291. With this, the processing by the predetermined function can be executed by using one group including the function blocks 201 to 205 for each of the optical signal transmitted from the terrestrial network 80 to the submarine cable 90 (hereinafter, referred to as a "downstream signal") and the optical signal transmitted from the submarine cable 90 to the terrestrial network 80 (hereinafter, referred to as an "upstream signal"). The connection configuration of the function blocks for the downstream signal and the connection configuration of the function blocks for the upstream signal may be different from each other. For example, the optical amplifier may be used only for the downstream signal. Further, in the function blocks denoted with the same name, the processing for the upstream signal and the processing for the downstream signal may be different from each other. For example, an output level of the amplification block for the upstream signal and an output level of the amplification block for the downstream signal may be different from each other.

The communication device 200 thus configured includes the function blocks 201 to 205 and the interfaces 281 to 291. The function blocks 201 to 205 that are optically connected via the interfaces 281 to 291 are capable of subjecting the optical signal to the processing based on the functions of the function blocks 201 to 205. Further, each of the function blocks is capable of processing the optical signal in collaboration with the other function blocks. As a result, similarly to the communication device 100 according to the first example embodiment, the communication device 200 is capable of providing various functions without increasing the types of hardware. An example of a communication system using the communication device 200 is described below.

Figure 6:
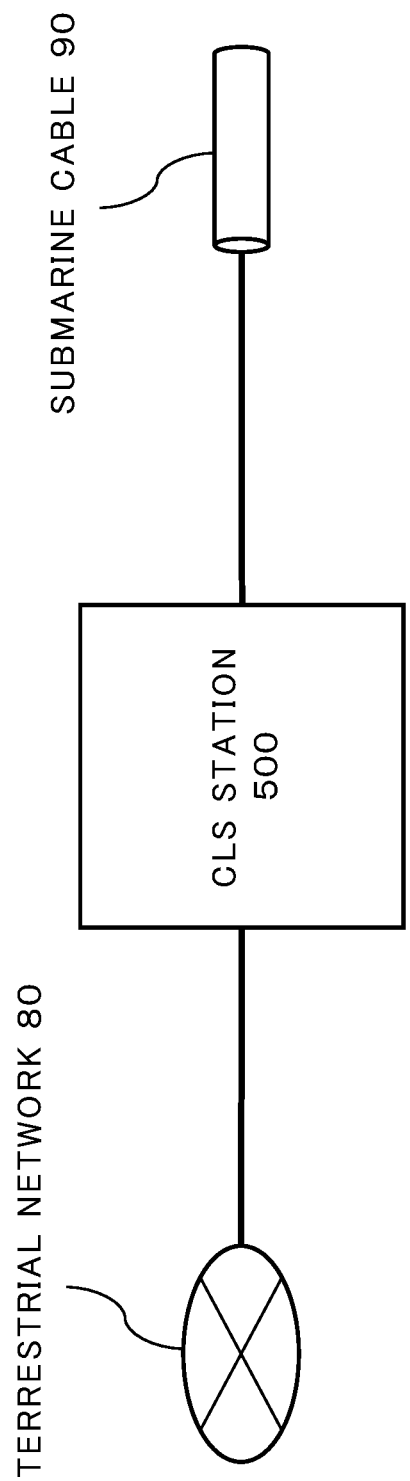
FIG. 6 is a block diagram illustrating a configuration example of a communication system 2 of the second example embodiment.

FIG. 6 is a block diagram illustrating a configuration example of a communication system 2 of the second example embodiment. The communication system 2 includes, the terrestrial network 80, the submarine cable 90, and a cable landing station (CLS) station 500. The optical signal propagating through the submarine cable 90 and the optical signal propagating through the terrestrial network 80 are terminated at a CLS station 500.

Figure 7:
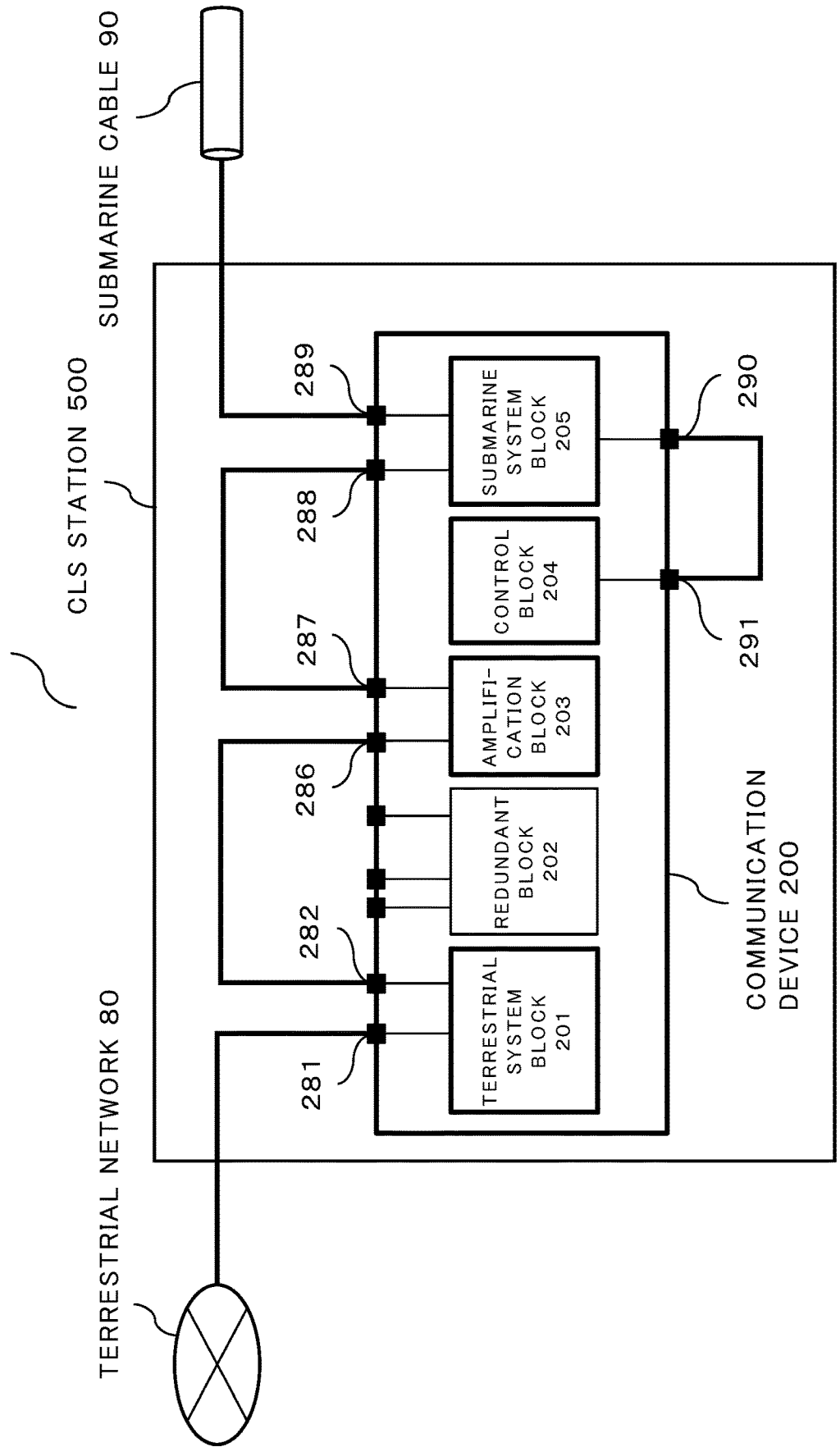
FIG. 7 is a diagram illustrating an example in which the communication device 200 is used to configure the communication system 2.

FIG. 7 is a diagram illustrating an example in which the communication device 200 is used to configure the communication system 2. The CLS station 500 is configured by using the communication device 200 described in FIG. 5. In the CLS station 500, the terrestrial system block 201, the amplification block 203, and the submarine system block 205 of the communication device 200 are used. Further, the control block 204 is connected to the submarine system block 205 as required. In the CLS station 500, the redundant block 202 is not used.

With reference to FIG. 7, description is made on a procedure that the CLS station 500 amplifies the downstream signal received from the terrestrial network 80, and transmits the downstream signal to the submarine cable 90.

The optical signal propagating through the terrestrial network 80 is received by the terrestrial system block 201 via the interface 281, and then is input to the amplification block 203 via the interfaces 282 and 286. The light amplified by the amplification block 203 is input to the submarine system block 205 via the interfaces 287 and 288. The submarine system block 205 receives the amplified optical signal, and outputs the amplified optical signal to the submarine cable 90. The submarine system block 205 may transmit, to the submarine cable 90, the optical signal received from the control block 204 together with the downstream signal input from the amplification block 203, as required. The communication device 200 further includes the function blocks for the upstream signal, and thus is also capable of subjecting the upstream signal propagating in the direction opposite of the downstream signal, to the processing as the CLS station 500. In this case, the upstream signal is received by the submarine system block for the upstream signal, and is amplified by the amplification block for the upstream signal. After that, the upstream signal is transmitted from the terrestrial system block for the upstream signal to the terrestrial network 80.

Third Example Embodiment

Figure 8:
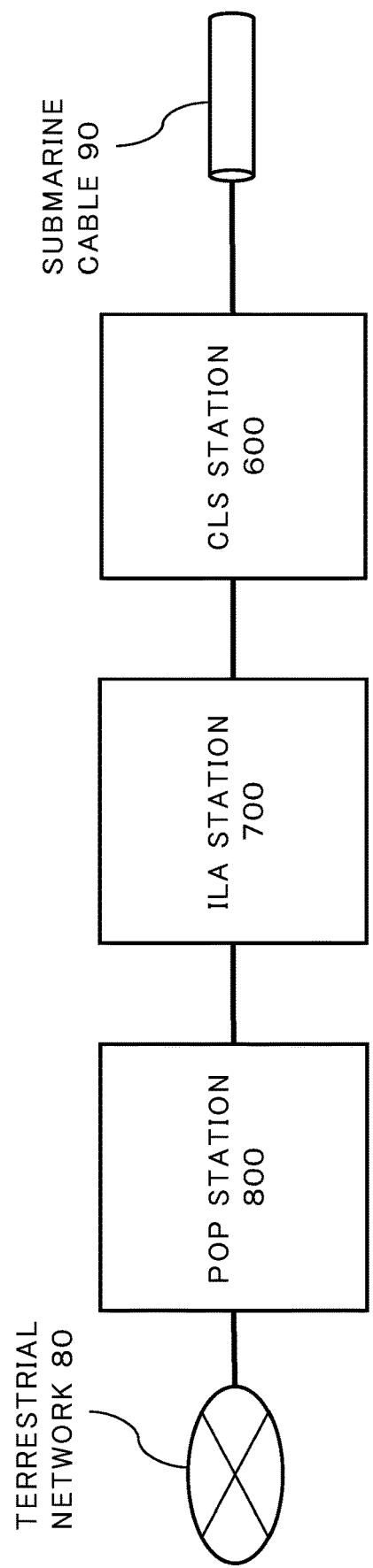
FIG. 8 is a block diagram illustrating a configuration example of a communication system 3 of a third example embodiment.

FIG. 8 is a block diagram illustrating a configuration example of a communication system 3 of a third example embodiment. The communication system 3 includes a CLS station 600, an inline amplifier station (ILA) station 700, and a point-of-presence (POP) station 800. The CLS station 600 includes a function as a connection point with the submarine cable 90. The ILA station 700 includes a function of amplifying the optical signal propagating between the POP station 800 and the CLS station 600. The POP station 800 includes a function as a connection point with the terrestrial network 80, which is arranged near an urban area.

By installing the ILA station 700, a transmission distance between the CLS station 600 and the POP station 800 can be expanded. When the transmission distance between the CLS station 600 and the POP station 800 is small, the CLS station 600 and the POP station 800 may be connected directly without the ILA station 700. The communication device 200 including the same hardware is used for each of the CLS station 600, the ILA station 700, and the POP station 800.

Figure 9:
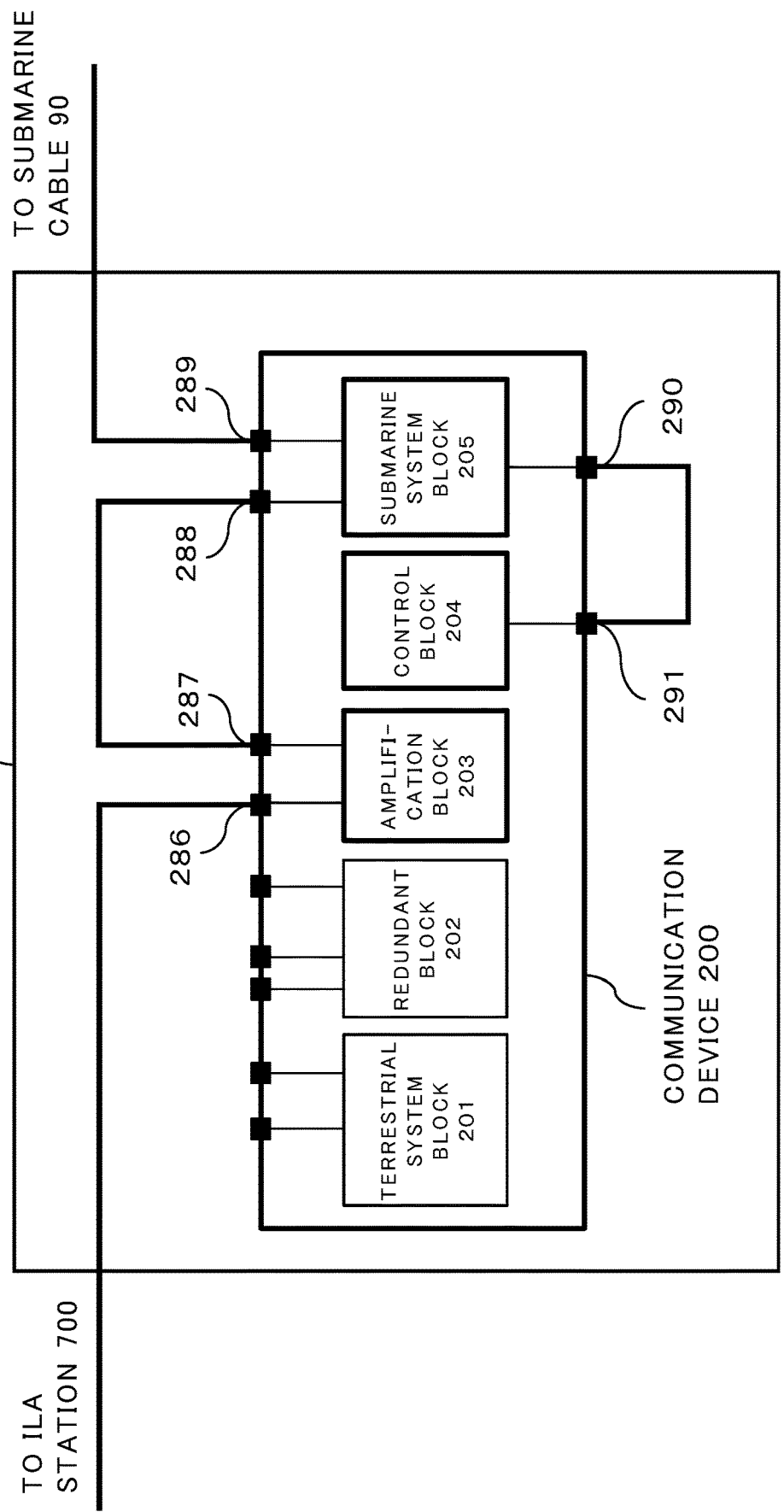
FIG. 9 is a diagram illustrating an example in which the communication device 200 is used to configure a CLS station 600.

FIG. 9 is a diagram illustrating an example in which the communication device 200 described in FIG. 5 is used to configure the CLS station 600. In the CLS station 600, the amplification block 203, the control block 204, and the submarine system block 205 of the communication device 200 are used, and the terrestrial system block 201 and the redundant block 202 are not used. The optical connection mode of these blocks in the CLS station 600 can be achieved through optical wiring only for the interfaces 286 to 291.

In the CLS station 600, the interface 286 of the amplification block 203 is connected to the interface 287 of the amplification block 203 in the ILA station 700. The interface 289 of the submarine system block 205 is connected to the submarine cable 90, and the interface 288 is connected to the interface 287 of the amplification block 203. Further, the interfaces 290 and 291 may be connected for monitoring and controlling the submarine cable 90. The submarine system block 205 transmits the optical signal amplified by the amplification block 203 to the submarine cable 90. The submarine system block 205 may transmit, to the submarine cable 90, the optical signal received from the control block 204 together with the optical signal input from the amplification block 203, as required.

Figure 10:
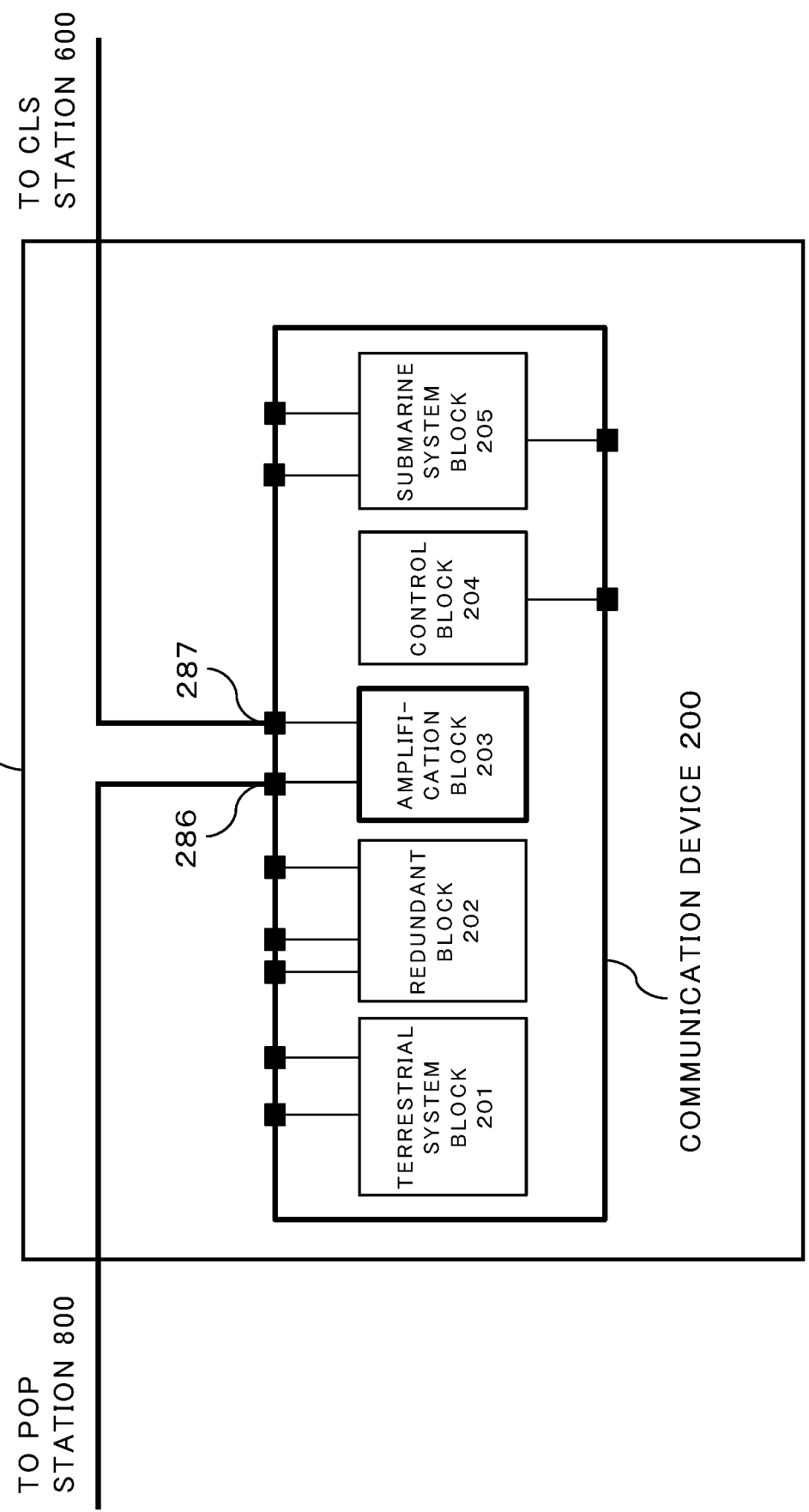
FIG. 10 is a diagram illustrating an example in which the communication device 200 is used to configure an ILA station 700.

FIG. 10 is a diagram illustrating an example in which the communication device 200 is used to configure the ILA station 700. In the ILA station 700, only the amplification block 203 of the communication device 200 is used, and the terrestrial system block 201, the redundant block 202, the control block 204, and the submarine system block 205 are not used. Such optical connection mode in the ILA station 700 can be achieved through optical wiring only for the interfaces 286 and 287.

The interface 286 of the amplification block 203 in the ILA station 700 is connected to the interface 287 of the amplification block 203 in the POP station 800. The interface 287 in the ILA station 700 is connected to the interface 286 of the amplification block 203 in the CLS station 600. In this manner, the ILA station 700 is arranged between the amplification block 203 in the POP station 800 and the amplification block 203 in the CLS station 600, and amplifies the optical signal.

Figure 11:
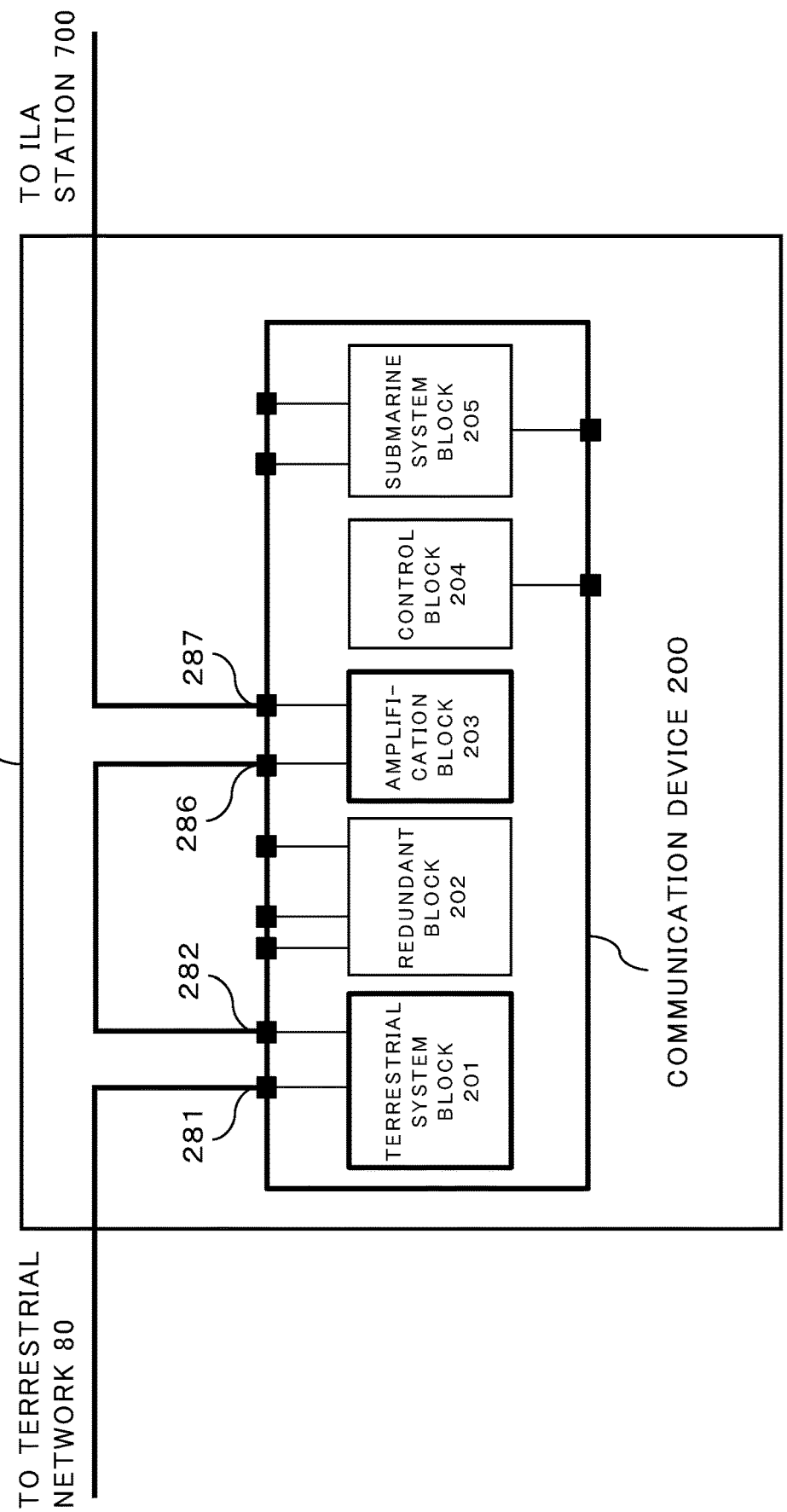
FIG. 11 is a diagram illustrating an example in which the communication device 200 is used to configure a POP station 800.

FIG. 11 is a diagram illustrating an example in which the communication device 200 is used to configure the POP station 800. In the POP station 800, only the terrestrial system block 201 and the amplification block 203 of the communication device 200 are used, and the redundant block 202, the control block 204, and the submarine system block 205 are not used. The optical connection mode described above in the POP station 800 can be achieved through optical wiring only for the interfaces 281, 282, 286, and 287.

In the POP station 800, the interface 281 of the terrestrial system block 201 is connected to the terrestrial network 80, and the interface 282 is connected to the interface 286 of the amplification block 203. The interface 287 of the amplification block 203 is connected to the interface 286 of the amplification block 203 in the ILA station 700.

Figure 12:
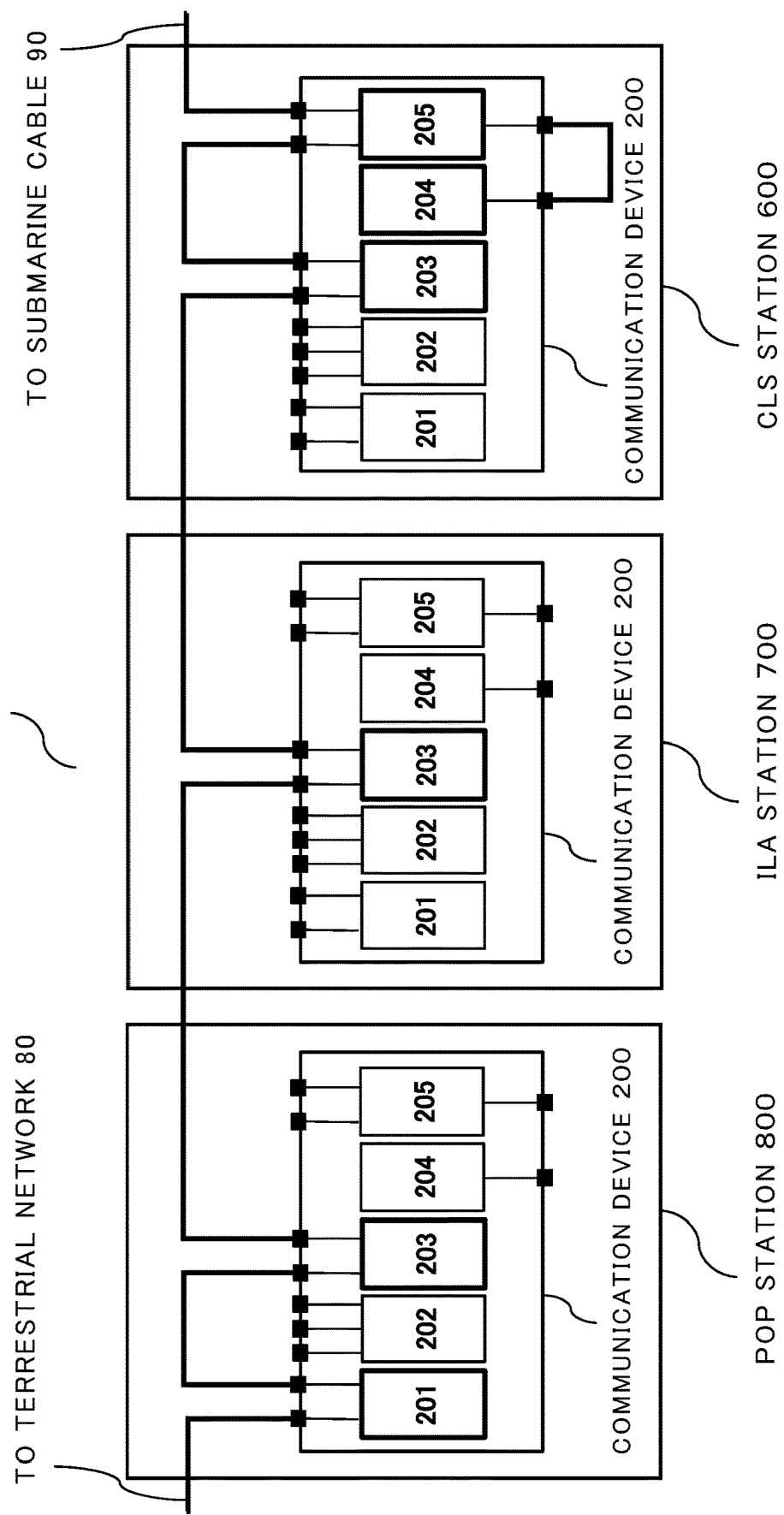
FIG. 12 is a diagram describing details of the configuration of the communication system 3.

FIG. 12 is a diagram for describing details of the configuration of the communication system 3 illustrated in FIG. 8. In FIG. 12, only the reference symbols for the function blocks are given, and descriptions of the terrestrial network 80 and the submarine cable 90 are omitted. The configurations of the CLS station 600, the ILA station 700, and the POP station 800 are described in FIG. 9 to FIG. 11, respectively. A case in which the downstream signal is transmitted from the terrestrial network 80 to the submarine cable 90 is described below. Similarly to the other example embodiments, the communication system 3 is also capable of subjecting the upstream signal to the processing by appropriately connecting the function blocks prepared for the upstream signal in each of the stations.

In the POP station 800, the terrestrial system block 201 receives the optical signal from the terrestrial network 80, and outputs the received optical signal to the amplification block 203. The amplification block 203 in the ILA station 700 is provided between the amplification block 203 in the POP station 800 and the amplification block 203 in the CLS station 600. Specifically, the ILA station 700 amplifies the optical signal amplified by the amplification block 203 in the POP station 800, and then outputs the optical signal to the amplification block 203 in the CLS station 600. The CLS station 600 further amplifies the optical signal amplified by the ILA station 700, and outputs the optical signal to the submarine cable 90.

In this manner, the communication system 3 includes a configuration in which the three optical amplifiers are arranged between the terrestrial system block 201 in the POP station 800 and the submarine system block 205 in the CLS station 600, and thus the terrestrial network 80 and the submarine cable 90 are connected. The communication device 200 is capable of changing the functions without replacing the hardware, and hence the communication device 200 can be used in common for establishing the CLS station 600, the ILA station 700, and the POP station 800 in the communication system 3. As a result, in the communication system 3, the hardware can be used in common.

Fourth Example Embodiment

Figure 13:
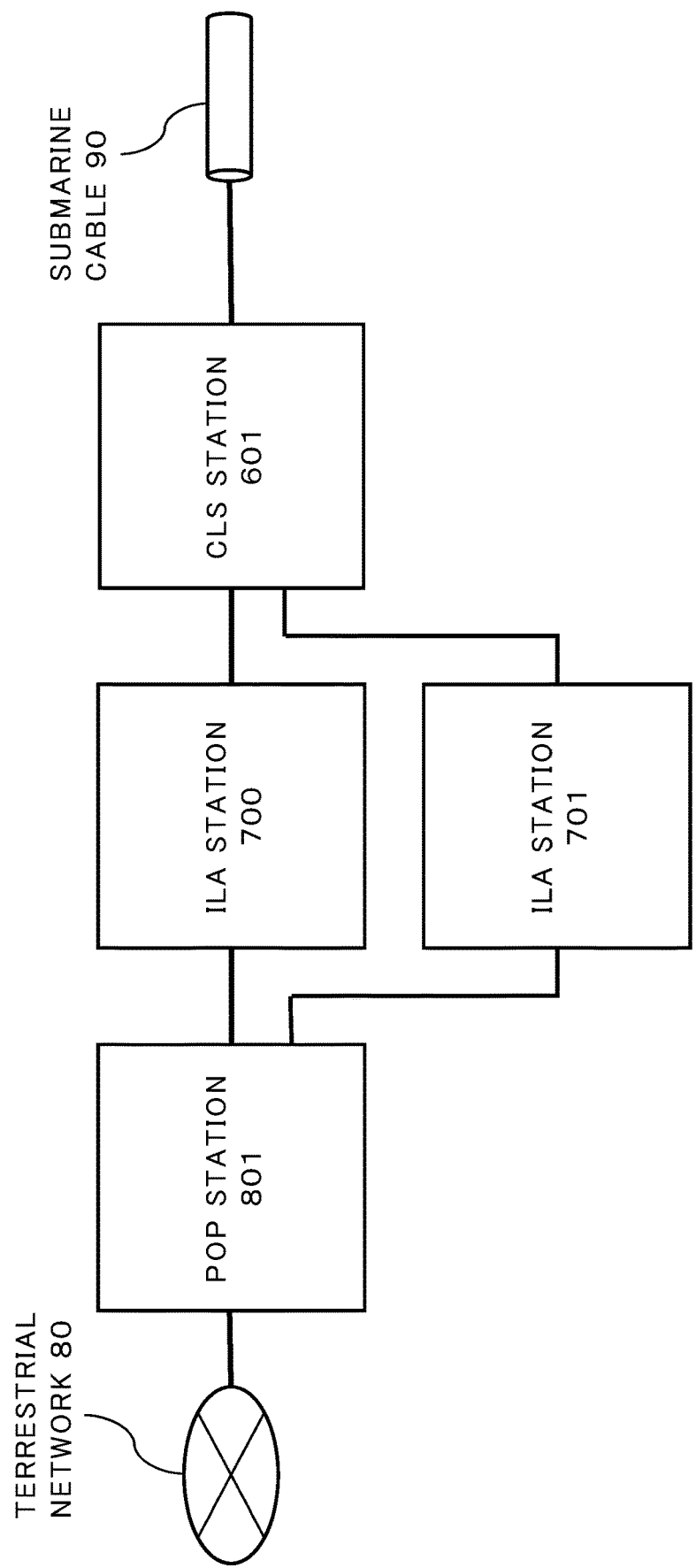
FIG. 13 is a block diagram illustrating a configuration example of a communication system 4 of a fourth example embodiment.

FIG. 13 is a block diagram illustrating a configuration example of a communication system 4 of a fourth example embodiment of the present invention. The communication system 4 includes a CLS station 601, ILA stations 700 and 701, and a POP station 801. In the communication system 4, the ILA stations 700 and 701 are connected in parallel, and thus the amplification block 203 of the ILA station 700 is provided with redundancy. The ILA station 701 includes a configuration similar to that of the ILA station 700 illustrated in FIG. 10, and amplifies the optical signal propagating the POP station 801 and the CLS station 601. The communication device 200 including the same hardware is used for each of the CLS station 601, the ILA stations 700 and 701, and the POP station 801. The redundant block 202 is used in each of the CLS station 601 and the POP station 801 for connecting the ILA stations 700 and 701, which is different from the CLS station 600 and the POP station 800 of the third example embodiment. The downstream signal transmitted from the terrestrial network 80 to the submarine cable 90 is described below as an example.

Figure 14:
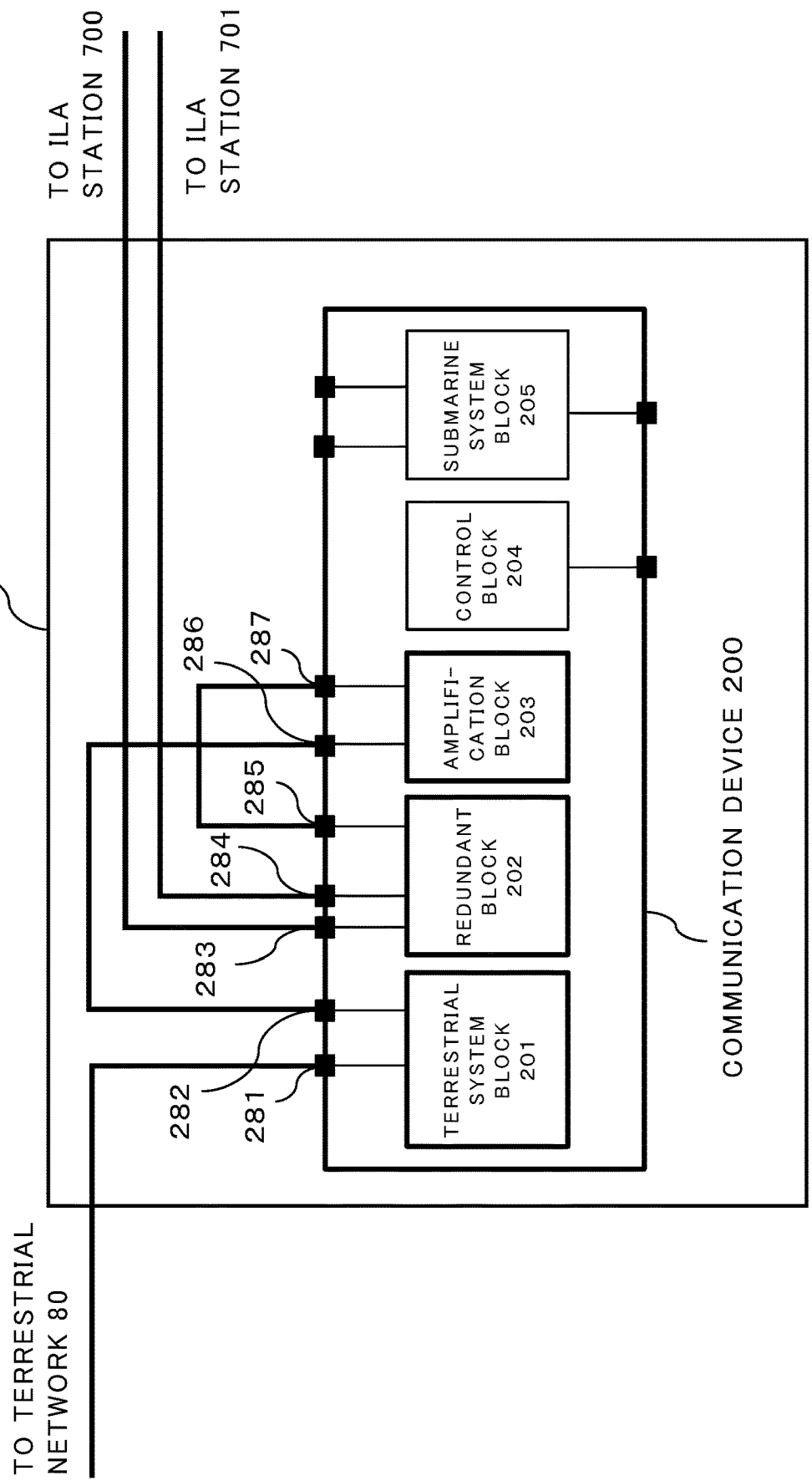
FIG. 14 is a diagram illustrating a configuration example of a POP station 801.

FIG. 14 is a diagram illustrating a configuration example of the POP station 801. In the POP station 801, only the terrestrial system block 201, the redundant block 202, and the amplification block 203 are used, and the control block 204 and the submarine system block 205 are not used. The optical connection mode of the function blocks in the POP station 801 can be achieved through optical wiring only for the interfaces 281 to 287 to be used.

In the POP station 801, the interface 281 of the terrestrial system block 201 is connected to the terrestrial network 80, and the amplification block 203 of the interface 282 is connected to the interface 286. The interface 287 of the amplification block 203 is connected to the interface 285 of the redundant block 202.

The redundant block 202 includes a 1×2 optical coupler. Inside the redundant block 202, each of the interfaces 283 and 284 and the interface 285 are optically connected via the 1×2 optical coupler. In the POP station 801, the redundant block 202 used for the downstream signal is capable of dividing the optical signal amplified by the amplification block 203 into the ILA stations 700 and 701. The divided optical signals are output to the ILA stations 700 and 701 via the interfaces 283 and 284, respectively.

The internal connection configurations of the ILA stations 700 and 701 are the same as to that of the ILA station 700 described in FIG. 10, and only the amplification block 203 is used. Each of the ILA stations 700 and 701 amplifies the optical signal input from the POP station 801, and outputs the optical signal to the CLS station 601. In general, the amplification block 203 in only one of the ILA stations 700 and 701 is operated, and the amplification block 203 in the other ILA station is operated when a failure occurs to the operated ILA station, which provides redundancy to the ILA stations. The amplification block 203 may include a function of shutting down an output of the optical signal by using an optical shutter or a variable optical attenuator when terminating the operation. The redundant configuration provided to the ILA stations 700 and 701 improves reliability of the communication system 4.

Figure 15:
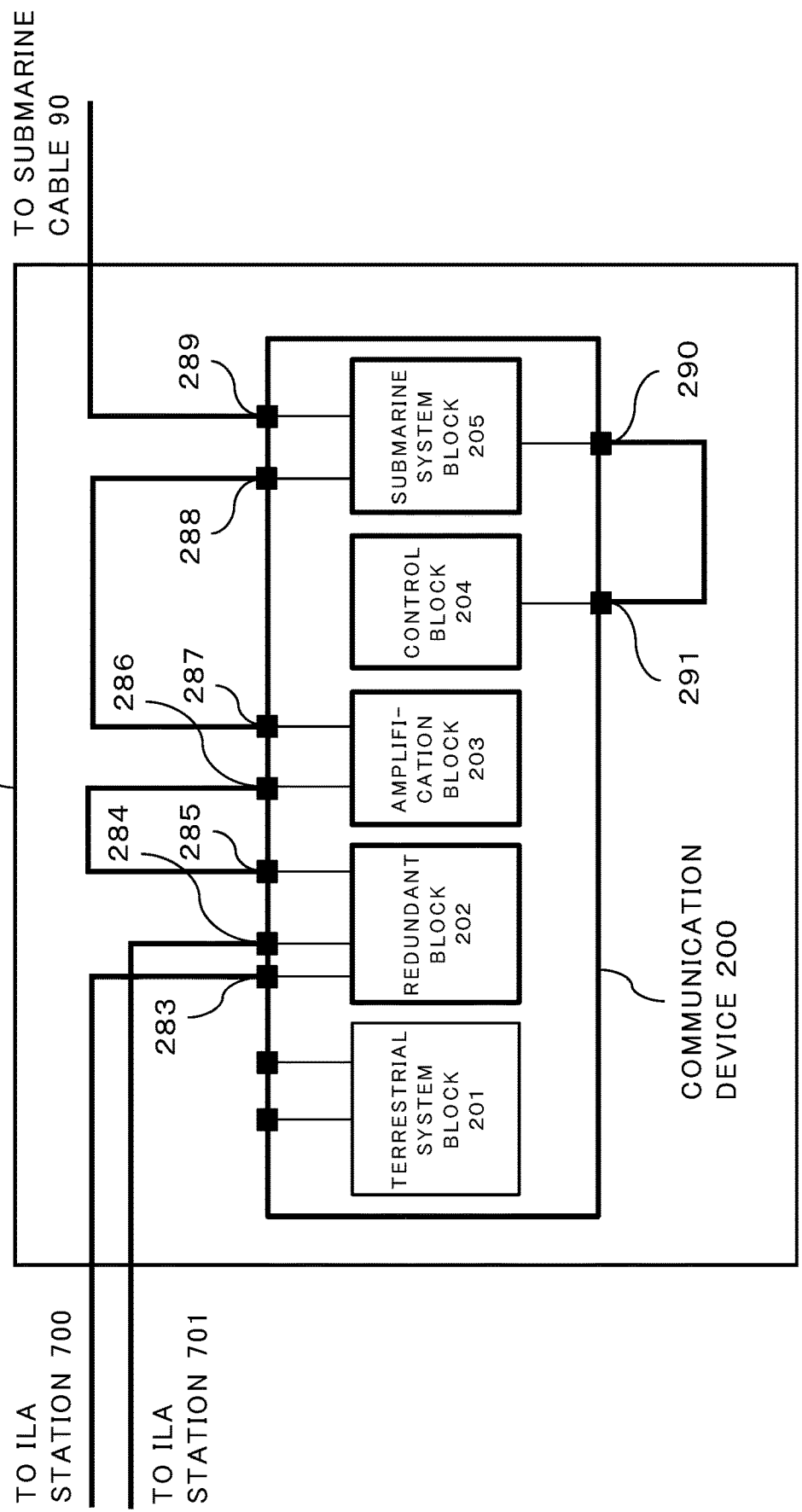
FIG. 15 is a diagram illustrating a configuration example of a CLS station 601.

FIG. 15 is a diagram illustrating a configuration example of the CLS station 601. In the CLS station 601, the redundant block 202, the amplification block 203, the control block 204, and the submarine system block 205 are used, and the terrestrial system block 201 is not used. The control block 204 may be used when monitoring and controlling for the submarine cable 90 are required. The optical connection mode of the function blocks in the CLS station 601 can be achieved through optical wiring only for the interfaces 283 to 291.

In the CLS station 601, the optical signals amplified by the ILA stations 700 and 701 are input to the interfaces 283 and 284 of the redundant block 202. The redundant block 202 couples the optical signals input from the interfaces 283 and 284 by using the optical coupler, and outputs the optical signal to the amplification block 203 via the interfaces 285 and 286. When only one of the ILA stations 700 and 701 is operated, only the optical signal from the operated ILA station is subjected to the processing in the CLS station 601. The amplification block 203 amplifies the input optical signal, and outputs the amplified optical signal to the submarine system block 205 via the interfaces 287 and 288. The submarine system block 205 transmits the optical signal amplified by the amplification block 203 to the submarine cable 90. The submarine system block 205 may transmit, to the submarine cable 90, the optical signal received from the control block 204 together with the optical signal input from the amplification block 203, as required.

Figure 16:
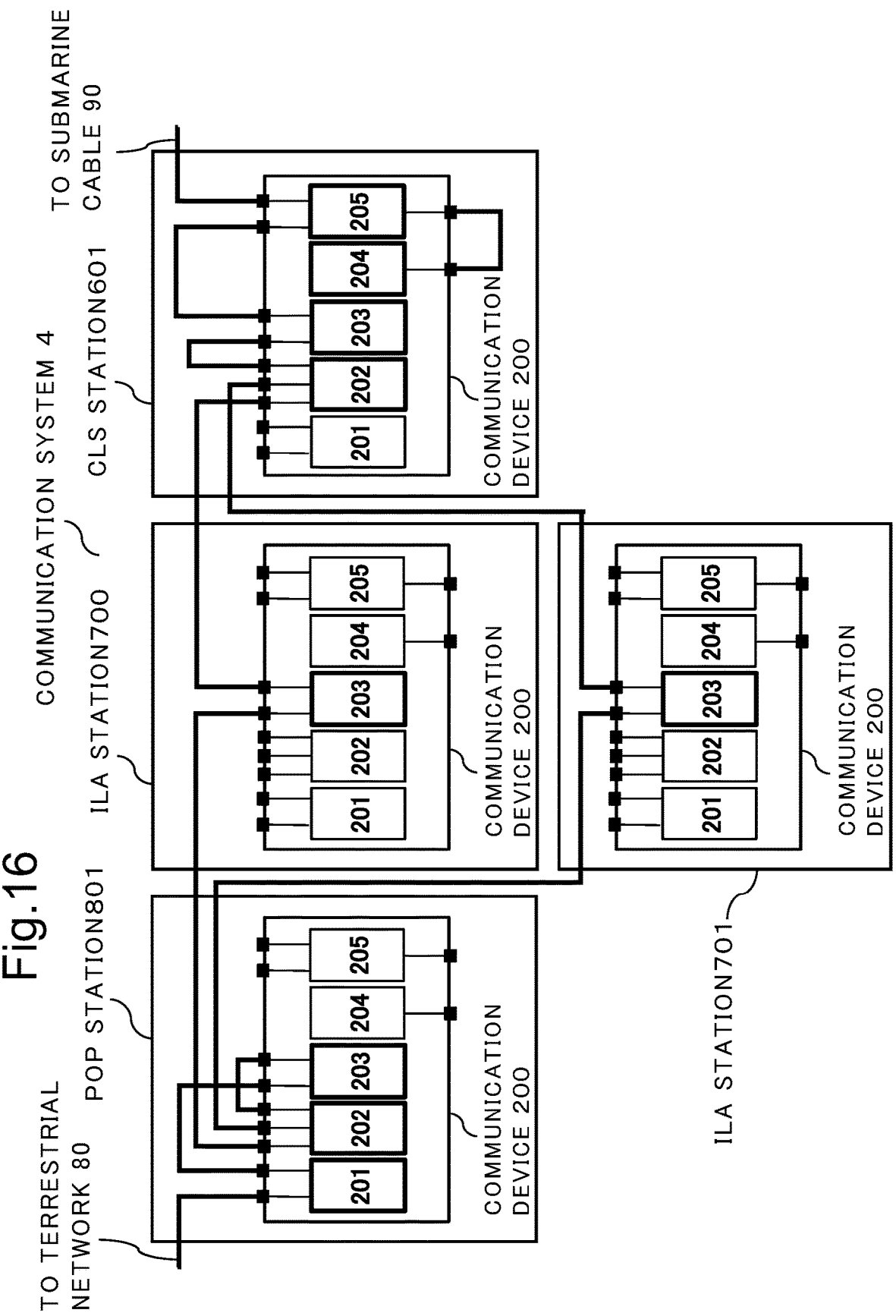
FIG. 16 is a diagram illustrating details of the configuration of the communication system 4.

FIG. 16 is a diagram illustrating details of the configuration of the communication system 4 illustrated in FIG. 13. In FIG. 16, only the reference symbols for the function blocks are given, and descriptions of the terrestrial network 80 and the submarine cable 90 are omitted. The connection configurations of the CLS station 601, the ILA stations 700 and 701, and the POP station 801 are described in FIG. 15, FIG. 10, and FIG. 14, respectively. A case in which the downstream signal is transmitted from the terrestrial network 80 to the submarine cable 90 is described below. Similarly to the other example embodiments, the communication system 4 is also capable of subjecting the upstream signal to the processing by appropriately connecting the function blocks prepared for the upstream signal in each of the stations.

The terrestrial system block 201 in the POP station 801 is connected to the terrestrial network 80. The optical signal split by the redundant block 202 in the POP station 801 is amplified by the ILA station 700 or 701. The redundant block 202 in the CLS station 601 couples the optical paths from the ILA stations 700 and 701. When only one of the ILA stations 700 and 701 is operated, only the optical signal input from the operated ILA station is subjected to the processing in the CLS station 601.

The ILA stations 700 and 701 are connected in parallel in the communication system 4, and hence, even when a failure occurs to one ILA station and the optical signal cannot be amplified, the amplification function can be maintained by operating the other ILA station. The redundant block 202 included in each of the CLS station 601 and the POP station 801 may include a 1×2 optical switch in place of the 1×2 optical coupler. For example, the 1×2 optical switch performs switching in such a way that only one of the ILA stations 700 and 701 forms an optical path between the CLS station 601 and the POP station 801. When a failure occurs to the operated ILA station 700, the optical switch performs switching in such a way that the ILA station 701 forms an optical path between the CLS station 601 and the POP station 801. Reduction in power of the optical signal due to a splitting loss at the 1×2 optical coupler can be suppressed by using the redundant block 202 including the 1×2 optical switch.

The communication device 200 can be used in common for establishing the CLS station 601, the ILA stations 700 and 701, and the POP station 801 in the communication system 4. As a result, similarly to the communication system 3, in the communication system 4, the hardware can also be used in common.

Fifth Example Embodiment

Figure 17:
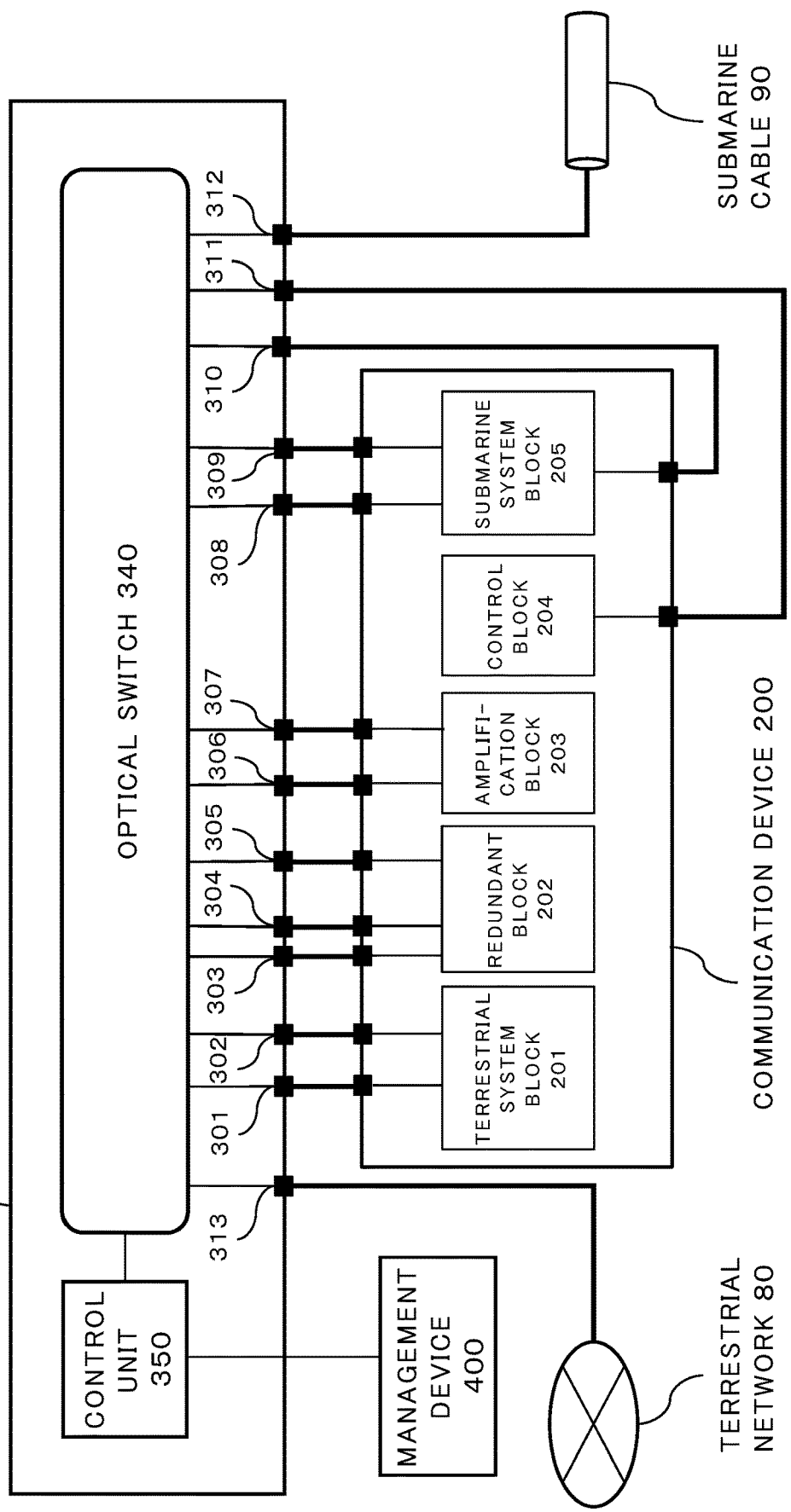
FIG. 17 is a block diagram illustrating a configuration example of a communication system 5 of a fifth example embodiment.

FIG. 17 is a block diagram illustrating a configuration example of a communication system 5 of a fifth example embodiment of the present invention. The communication system 5 includes the communication device 200 illustrated in FIG. 5 and an optical connection device 30. The optical connection device 30 includes interfaces 301 to 313, an optical switch 340, and a control unit 350. The interfaces 301 to 313 are interfaces connected to ports of the optical switch 340. The interfaces 301 to 313 are connected to the interfaces 281 to 291 of the communication device 200, the submarine cable 90, and the terrestrial network 80. The interfaces 312 and 313 may be connected to other communication devices. The optical switch 340 connects the interfaces 301 to 313 under control of the control unit 350. The control unit 350 controls the optical switch 340, and thus can connect the interfaces 281 to 291 of the communication device 200 in the optical connection modes illustrated in, for example, FIG. 7, FIGS. 9 to 11, FIG. 14, and FIG. 15.

In addition to an effect of providing various functions without increasing the types of hardware, which is exerted by the communication device 200, the communication system 5 thus configured can exert an effect that a worker is not required to perform an operation of connecting the optical patch cords in front of the communication device 200. For example, in the communication system 5, occurrence of a failure due to an error of connection of the optical patch cords by a worker can be suppressed. The control unit 350 may be controlled by a management device 400 that is arranged outside of the optical connection device 30. The management device 400 is connected to the control unit 350 via a communication line, and controls an operation of the optical switch 340 by the control unit 350. Specifically, the management device 400 remotely controls the optical switch 340. Even when it is required to change the optical connection mode between the interfaces 281 to 291 of the communication device 200, the management device 400 enables changing of the optical connection mode of the optical patch cords without dispatching a worker to a site on which the communication device 200 is installed.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. For example, functions of the function blocks are not limited to the examples in the example embodiments. The function blocks may include other functions to be used in the optical communication device.

Further, the configurations described in the example embodiments are not necessarily exclusive to one another.

The actions and the effects of the present invention may be achieved by a configuration acquired by combining all or some of the example embodiments described above.

REFERENCE SIGNS LIST 1 to 5 Communication system
11 to 13 Function block
15 to 19 Optical patch cord
21 to 26 Interface
30 Optical connection device
61 to 63 Function block
71 to 76 Interface
80 Terrestrial network
90 Submarine cable
100, 110, 200 Communication device
201 Terrestrial system block
202 Redundant block
203 Amplification block
204 Control block
205 Submarine system block
281 to 291 Interface
301 to 313 Interface
340 Optical switch
350 Control unit
400 Management device
500, 600, 601 CLS station
700, 701 ILA station
800, 801 POP station

What is claimed is:

1. A communication device to be used in a submarine cable system, the communication device comprising:
a plurality of function blocks, wherein:
the function blocks each include an interface connectable with an optical signal through an external optical path being external to the communication device,
one of the function blocks is optically connectable to a terrestrial communication network via the interface,
another of the function blocks is optically connectable to a submarine cable via the interface,
two or more of the functional blocks included in the communication device are optically connected in series via the external optical path, and
the two or more of the function blocks optically connected in series subjects the optical signal to processing based on a function of the two or more of the function blocks.

2. The communication device according to claim 1, wherein the communication device is configured to change a predetermined function by changing an optical connection mode indicating a connection relationship between the interfaces.

3. The communication device according to claim 2, wherein the optical connection mode is defined by connection of an optical patch cord between the interfaces.

4. The communication device according to claim 2, further comprising an optical switch in which the interfaces are connected to an input and an output,
wherein the optical connection mode is defined by a setting of connection between the input and the output of the optical switch.

5. A communication system comprising:
a first communication device; and
a second communication device,
wherein each of the first communication device and second communication device comprise a plurality of function blocks,
wherein the function blocks each include an interface connectable with an optical signal through an external optical path being external to the communication device,
one of the function blocks is optically connectable to a terrestrial communication network via the interface,
another of the function blocks is optically connectable to a submarine cable via the interface,
two or more of the functional blocks included in the communication device are optically connected in series via the external optical path,
the two or more of the function blocks optically connected in series subject the optical signal to processing based on a function of the two or more of the function blocks,
each of the first communication device and the second communication device changes a predetermined function by changing an optical connection mode indicating a connection relationship between the interfaces,
the optical connection mode of the first communication device is a first optical connection mode and the optical connection mode of the second communication device is a second optical connection mode, and
the first communication device and the second communication device are connected.

6. A communication system comprising:
the communication device according to claim 1;
the terrestrial communication network; and
the submarine cable,
wherein the communication device is connected to at least one of the terrestrial communication network and the submarine cable.

7. A communication device configuration method that is used in a submarine cable system and includes a plurality of function blocks each including an interface connectable with an optical signal through an external optical path being external to the communication device, the method comprising:
configuring one of the function blocks to be optically connectable to a terrestrial communication network via the interface;
configuring another of the function blocks to be optically connectable to a submarine cable via the interface;
configuring two or more of the functional blocks included in the communication device to optically connect in series via the external optical path; and
subjecting the optical signal to processing based on a function of the two or more of the function blocks, by the two or more of the function blocks optically connected via the interface.

8. The communication device configuration method according to claim 7, further comprising changing a predetermined function of the communication device by changing an optical connection mode indicating a connection relationship between the interfaces.

9. The communication device configuration method according to claim 8, further comprising defining the optical connection mode by connection of an optical patch cord between the interfaces.

10. The communication device configuration method according to claim 8, further comprising:
connecting the interfaces to an input and an output of an optical switch; and
defining the optical connection mode by a setting of connection between the input and the output of the optical switch.

* * * * *